(12) United States Patent
Berende et al.

(10) Patent No.: US 11,933,019 B2
(45) Date of Patent: Mar. 19, 2024

(54) VEHICLE COMPRISING A STABILIZER, AND STABILIZER FOR SUCH A VEHICLE

(71) Applicants: P. BERENDE HOLDING B.V., Oosterhout (NL); NIJHUIS ENGINEERING DRONTEN B.V., Dronten (NL)

(72) Inventors: Petrus Cornelis Adrianus Maria Berende, Oosterhout (NL); Daniel P. J. Stee, Zeewolde (NL)

(73) Assignees: P. BERENDE HOLDING B.V., Oosterhout (NL); NIJHUIS ENGINEERING DRONTEN B.V., Dronten (NL)

( * ) Notice: Subject to any disclaimer, the term of this patent is extended or adjusted under 35 U.S.C. 154(b) by 0 days.

(21) Appl. No.: 17/439,026

(22) PCT Filed: Mar. 19, 2020

(86) PCT No.: PCT/NL2020/050186
§ 371 (c)(1),
(2) Date: Sep. 14, 2021

(87) PCT Pub. No.: WO2020/190140
PCT Pub. Date: Sep. 24, 2020

(65) Prior Publication Data
US 2022/0145585 A1    May 12, 2022

(30) Foreign Application Priority Data
Mar. 19, 2019  (NL) ..................................... 2022762

(51) Int. Cl.
*E02F 9/02*       (2006.01)
*B60F 1/04*       (2006.01)

(52) U.S. Cl.
CPC ................ *E02F 9/022* (2013.01); *B60F 1/04* (2013.01); *E02F 9/028* (2013.01)

(58) Field of Classification Search
CPC .. E02F 9/022; E02F 9/028; B60F 1/04; B60F 1/043; B60F 2301/02
See application file for complete search history.

(56) References Cited

U.S. PATENT DOCUMENTS 3,003,433 A * 10/1961 Hoppe .................... B60F 1/005
                                                   105/72.2
3,228,350 A *  1/1966 Cox ........................ B60F 1/043
                                                   105/72.2

(Continued)

FOREIGN PATENT DOCUMENTS

| DE | 1455203 A1 | 5/1969 |
| DE | 19643240 C1 | 3/1998 |
| EP | 3225496 A1 | 10/2017 |

OTHER PUBLICATIONS

International Search Report and Written Opinion for the International Patent Application No. PCT/NL2020/050186, dated Jun. 16, 2020, 20 pages.

*Primary Examiner* — Edwin J Toledo-Duran
(74) *Attorney, Agent, or Firm* — KDW Firm PLLC

(57) ABSTRACT

A vehicle includes a chassis, and a stabilizer including a support frame that has a wheel support that is configured to support at least one shaft and two wheels arranged on opposite sides relative to a longitudinal axis of said vehicle and defining a track width between said two wheels. A base supports the support frame, and a suspension connects the base relative to the chassis and is configured to allow a free vertical displacement of one of the base and the chassis relative to the other over a restricted range. A stabilizer of or for such a vehicle.

14 Claims, 11 Drawing Sheets

(56) References Cited

U.S. PATENT DOCUMENTS

| | | | | |
|---|---|---|---|---|
| 3,581,671 A * | 6/1971 | Hart | ............ | B60F 1/005 |
| | | | | 105/72.2 |
| 3,645,211 A * | 2/1972 | Gretzschel | ......... | B60F 1/005 |
| | | | | 105/72.2 |
| 3,701,323 A * | 10/1972 | Cox | ............ | B60F 1/043 |
| | | | | 105/72.2 |
| 3,762,337 A * | 10/1973 | McKeon | ......... | B61C 11/005 |
| | | | | 105/215.2 |
| 3,804,025 A * | 4/1974 | Elliott | ......... | B60F 1/005 |
| | | | | 105/72.2 |
| 3,980,025 A * | 9/1976 | Olson, Sr. | ......... | B60F 1/043 |
| | | | | 105/72.2 |
| 4,060,035 A * | 11/1977 | Swoager | ......... | B60F 1/046 |
| | | | | 105/364 |
| 4,240,354 A * | 12/1980 | Newman | ......... | B61D 15/02 |
| | | | | 105/72.2 |
| 5,756,903 A * | 5/1998 | Norby | ......... | B60F 1/005 |
| | | | | 73/146 |
| 6,352,035 B1 * | 3/2002 | Kashiwase | ......... | B60F 1/043 |
| | | | | 105/215.1 |

* cited by examiner

VEHICLE COMPRISING A STABILIZER, AND STABILIZER FOR SUCH A VEHICLE

This is a national stage application filed under 35 U.S.C. § 371 of pending international application PCT/NL2020/050186, filed Mar. 19, 2020, which claims priority to Netherlands Patent Application No. NL 2022762, filed Mar. 19, 2019, the entirety of which applications are hereby incorporated by reference herein.

The present invention relates to a vehicle comprising a stabilizer. The invention further relates to a stabilizer of or for such a vehicle.

Stabilization of vehicles is often related to safety concerns. For example, a road or terrain vehicle may require stabilization to prevent excess tilt and possibly tipping over of the vehicle. Whereas cranes are normally used in a static situation wherein they may be stabilized with extendable support legs, certain types of cranes and excavators should be able to move. However, because e.g. a crane or an excavator may have a long boom and arm carrying load, stabilization is especially important for an excavator.

Whereas road or terrain vehicles may be designed with a relative wide track width, this freedom of design is not available for rail vehicles. After all, rail vehicles are, when they are driven on a rail track, forced to have a relative limited track width that is dictated by the transverse distance between the parallel rails of the rail tracks. The relatively small track width of rail vehicles results in a limited transverse stability, especially when the tracks are uneven and/or if there are any loads on the rail vehicle in a direction transverse to the rail track. For example, a rail bound vehicle, such as a crane or an excavator, may experience considerable transverse loads when lifting loads on the side of the rail track.

Rail vehicle are vehicles that drive on rails, and may on the one hand comprise fully track bounded vehicles such as trains, trams and subways. On the other hand, there exist also hybrid rail vehicles that are configured to drive both on a road and on rails, also called rail/road vehicles. Such hybrid rail vehicles may for example be excavators used to lay a new rail track or maintain an existing rail track, or towing vehicles that may be used for e.g. shunting of rail wagons.

It is of utmost importance that a rail vehicle that drives on a rail track remains on said rail track under all circumstances. If this fails, the rail vehicle may easily slide of the rail track, which is known as derailment. Derailment is related to serious safety concerns, and may be caused by a plurality of factors. For a fully track bounded vehicle such as a train, an uneven track may cause derailment. Especially rail tracks that are still under construction may experience an uneven geometry that increases the risk of derailment. This risk of derailment increases even further if the rail vehicle is a vehicle with a varying center of gravity (COG), such as an excavator, or a hybrid rail vehicle. After all, during use an excavator may experience loads that are directed transverse to the rail track. Such transverse loads may cause a tilting of the excavator relative to the rail track. When track wheels are lifted, they may easily slide of the rail track. Moreover, a hybrid rail vehicle that is also suitable to drive on a regular road surface will comprise road wheels or caterpillars. When driving over a rail track, such road wheels or tracks may contact an obstacle adjacent the rail track, thereby lifting the hybrid rail vehicle on that respective side and possibly causing derailment. This risk of derailment is relatively high for hybrid rail vehicles in a so-called "low-rider" configuration, because the road wheels or caterpillars are in contact with the rail tracks for propulsion of the hybrid rail vehicle, resulting in the road wheels or caterpillars being relatively close to the ground where they may come into contact with an obstacle.

The European patent application EP 3 225 496 A1, which is considered the closest prior art, discloses a vehicle, comprising a chassis and a stabilizer, wherein said stabilizer comprises a support frame that comprises a wheel support that is configured to support at least one shaft and two wheels arranged on opposite sides relative to a longitudinal axis of said vehicle. It discloses a conventional configuration of a main part that is attached to the chassis via two connecting arms and two hydraulic cylinders. The hydraulic cylinders are configured to move the track wheels between a retracted and a deployed state. The support frame of the stabilizer is thus directly attached to the chassis. A center pivot provides a pendulum suspension that allows the chassis to pivot relative to the support frame, thereby allowing the excavator to tilt over a limited range. If a track bounded excavator having a pendulum suspension as disclosed in EP 3 225 496 A1 carries a too heavy load sideward relative to the excavator while it is supported on rail tracks, an imaginary line extending from a track wheel to the center pivot of the pendulum suspension will define a pivot axis. The center pivot being centrally arranged relative to a width direction of the excavator causes the pivot axis to pass relatively close nearby a center of gravity (COG) of the excavator. Tilting of the excavator over only a limited range may already result in the COG being positioned above or even beyond the pivot axis, resulting in an accelerated further tilting of the excavator and a high risk of derailment thereof.

DE 14 55 203 A1, discloses a hybrid rail vehicle, which is embodied as an excavator that has a so-called low-rider configuration, wherein the hybrid rail vehicle is driven by the road wheels that are in contact with the rail track. It comprises both road wheels and track wheels. Said track wheels are each independently pivotable relative to a chassis. Using hydraulic cylinders, said track wheels may either be pressed downwards on the rail track or lifted upwards to allow the road wheels to drive the hybrid rail vehicle next to the rail track. The hydraulic cylinders are configured to impose a spring-loaded downward force of the track wheels on the track, which provides a safe contact of the hybrid rail vehicle on the track in a normal driving situation. However, when this excavator is used to carry a load on a side of said vehicle away at a sideward distance from the rail track a serious risk of derailment would occur. When a heavy load is carried on e.g. a right side of the vehicle and rail track, the excavator is exposed to a force trying to tip the excavator over towards said right side. The track wheels on the right side would be compressed and define a pivot axis, whereas the spring-loaded rails on the left side of the excavator would actually push the left side upwards, thereby contributing to the risk of derailment or tipping over. After all, the spring-loaded downward force of the track wheels on the track impose an equal but opposite force pushing the chassis in an upward direction. The above described disadvantageous effect of the independent spring-loaded wheels impose a serious safety concern of the system described in DE 14 55 203 A1.

U.S. Pat. No. 3,228,350 A discloses a guiding apparatus for operating highway vehicles on railroad tracks, comprising a plurality of sets of track wheels that may be selectively lowered or raised relative to a chassis of said highway vehicle. When lowered, the sets of track wheels may lift the vehicle relative to the railroad tracks.

The German patent application DE 196 43 240 C1 is acknowledged as further prior art.

There exists an ongoing need to further improve stability of vehicles in general, and especially of rail vehicles.

An objective of the present invention is to provide a vehicle that is improved relative to the prior art and wherein at least one of the above stated problems is obviated.

Said objective is achieved with the vehicle according to the present invention, comprising:
- a chassis; and
- a stabilizer comprising:
    - a support frame that comprises a wheel support that is configured to support at least one shaft and two wheels arranged on opposite sides relative to a longitudinal axis of said vehicle and defining a track width between said two wheels,
    - a base supporting said support frame; and
    - a suspension connecting said base relative to said chassis and configured to allow a free vertical displacement of one of the base and the chassis relative to the other over a restricted range.

Contrary to the prior art, such as the hybrid rail vehicle in the closest prior art EP 3 225 496 A1, the vehicle according to the invention does not connect the support frame directly to the chassis. Instead, it proposes to apply a base supporting said support frame, and a suspension connecting said base relative to said chassis and configured to allow a free vertical displacement of one of the base and the chassis relative to the other over a restricted range.

The two wheels that are arranged on opposite sides relative to the longitudinal axis of said vehicle define a set of wheels.

The suspension of the stabilizer allows the support frame and the chassis to move relative to each other. Thus, when the chassis tilts for some reason, e.g. due to a vehicle driving on a sloping terrain or when an excavator lifts a load on a side thereof, the chassis may move relative to the support frame. The support frame, that supports the at least one shaft and the two wheels, thereby allows the two wheels to remain unaffected by the tilt of the chassis. Moreover, not only does the stabilizer with its suspension allow the wheels to remain on the ground, the weight of the stabilizer also contributes to the force at which the wheels are pushed on the ground. The stabilizer thus functions two-fold: on the one hand if provides sufficient free vertical displacement, while on the other hand it increases the load on the wheels.

If the vehicle is a rail vehicle, the set of wheels supported by the support frame comprises track wheels. The suspension provides free vertical displacement of one of the support frame and the chassis relative to the other, thereby reducing the risk of derailment. After all, the suspension effectively prevents that a movement of the chassis is directly transferred to a movement of the support frame. Thus, when the chassis moves, the support frame may still continue to support the at least one shaft in an orientation wherein the track wheels are in a secure contact with the respective rail track. Also the weight of the support frame supporting the at least one shaft and the set of track wheels contributes to the force pressing the track wheels on the rail track.

According to a preferred embodiment, the suspension comprises two lower stops arranged on opposite sides relative to the longitudinal axis of said vehicle. The longitudinal axis is a central longitudinal axis that passes through a center of gravity (COG) of the vehicle. It consequently divides the vehicle in substantially two identical halves. The two stops freely support the chassis relative to the stabilizer, causing the chassis to rest on the two stops during normal use and/or in an unloaded situation. However, if the chassis is loaded for some reason, the chassis may tilt relative to the stabilizer.

If the vehicle is a rail vehicle, and in particular if it is a hybrid rail vehicle embodied as an excavator, such a load may be caused e.g. due to a road wheel accidentally coming into contact with an obstacle near the rail track, or due to the excavator lifting a heavy load on a side of said excavator.

If the chassis tilts relative to the stabilizer, this causes the chassis to be lifted relative to one of the two stops, while the other one of the two stops will start to function as a pivot for said tilting chassis. If an excavator lifts a load on a right side of said excavator, the chassis may tilt towards the right side, wherein the chassis is lifted off of the left lower stop, while the right lower stop will start to function as a pivot. By allowing the chassis to be lifted off of one of the stops, it is prevented that the tilting chassis unloads the wheel of the side where the chassis is lifted. Consequently, it is guaranteed that the weight of the support frame, that comprises the wheel support, shaft and wheels, remains on the wheels when the chassis starts to tilt a little bit, thereby providing a secure ground contact. For a rail track bounded vehicle this secure ground contact will reduce the risk of derailment significantly.

According to a further preferred embodiment, each one of the lower stops is arranged in between the two wheels. If a lower stop temporarily functions as a pivot for the chassis, a position of said lower stop guarantees that the resulting temporary pivot is also arranged in between the two wheels, providing stability and a predictable behaviour of said vehicle.

According to an even further preferred embodiment, each one of the lower stops is arranged in an outer half of the distance between the longitudinal axis of said vehicle and the wheel on that respective side. Thus, each one of the lower stops is preferably arranged in an outer quart of the track width defined by the two wheels. If the complete track width is defined as a width of 100%, one of the lower stops is arranged in the area 0-25%, and the other one of the lower stops is arranged in the area 75-100%. In this preferred area for the lower stops, the pivot is on the one hand far enough away from the central longitudinal axis to maintain an imaginary pivot axis of said vehicle relatively far away from the center of gravity of said vehicle, causing an improved stability relative to conventional configurations having a pendulum suspension arranged halfway the width of the vehicle. On the other hand, the pivot is also still arranged, in width direction, in between the two wheels.

According to an even further preferred embodiment, the suspension comprises two upper stops arranged on opposite sides relative to the longitudinal axis of said vehicle. As discussed above, if the chassis tilts relative to the stabilizer, this causes the chassis to be lifted relative to one of the two stops, while the other one of the two stops will start to function as a pivot for said tilting chassis. An upper stop arranged on the same side as where the chassis is lifted off of the respective lower stop may restrict the distance over which the chassis may be freely lifted upward. Once the upward lifting movement is restricted by the upper stop, a very advantageous effect occurs that further increases the safety of said vehicle. After all, as soon as the tilting chassis engages the upper stop, a very noticeable feeling will warn the driver that the maximum tilt corresponding to the free vertical displacement the chassis relative the base of the stabilizer has been reached. Furthermore, due to the chassis engaging the upper stop, a further tilting of said chassis will be counteracted in two ways. On the one hand, the upper stop being engaged will only allow the chassis to tilt even further if it would also tilt the stabilizer along, meaning that the weight counteracting this tilting movement is significantly increased. On the other hand, the pivot around which the tilting occurs is no longer defined by the lower stop. Instead, the pivot is now displaced outward and downward to the contact point of the wheels on the ground. The combination of the additional weight counteracting the tilting movement of the vehicle and the pivot point being displaced outward and downward provides a relatively large safety margin, and the driver is already notified of entering this safety margin by the chassis being stopped by the upper stop. In this way, a very stable and safe vehicle is obtained.

According to an even further preferred embodiment, each one of the upper stops is arranged in between the two wheels. Each one of the upper stops is more preferably arranged in an outer half of the distance between the longitudinal axis of said vehicle and the wheel on that respective side. Thus, each one of the upper stops is arranged in an outer quart of the track width defined by the two wheels. If the complete track width is defined as a width of 100%, one of the upper stops is arranged in the area 0-25%, and the other one of the upper stops is arranged in the area 75-100%.

The invention further relates to a stabilizer of or for a vehicle according to the invention, wherein said stabilizer comprises:
- a support frame that comprises a wheel support that is configured to support at least one shaft and two wheels arranged on opposite sides relative to a longitudinal axis of said vehicle and defining a track width between said two wheels;
- a base supporting said support frame; and
- a suspension configured to connect said base relative to a chassis of the vehicle wherein said suspension is configured to allow a free vertical displacement of one of the base and the chassis relative to the other over a restricted range.

Preferred embodiments are the subject of the dependent claims.

In the following description preferred embodiments of the present invention are further elucidated with reference to the drawing, in which.

Figure 1:
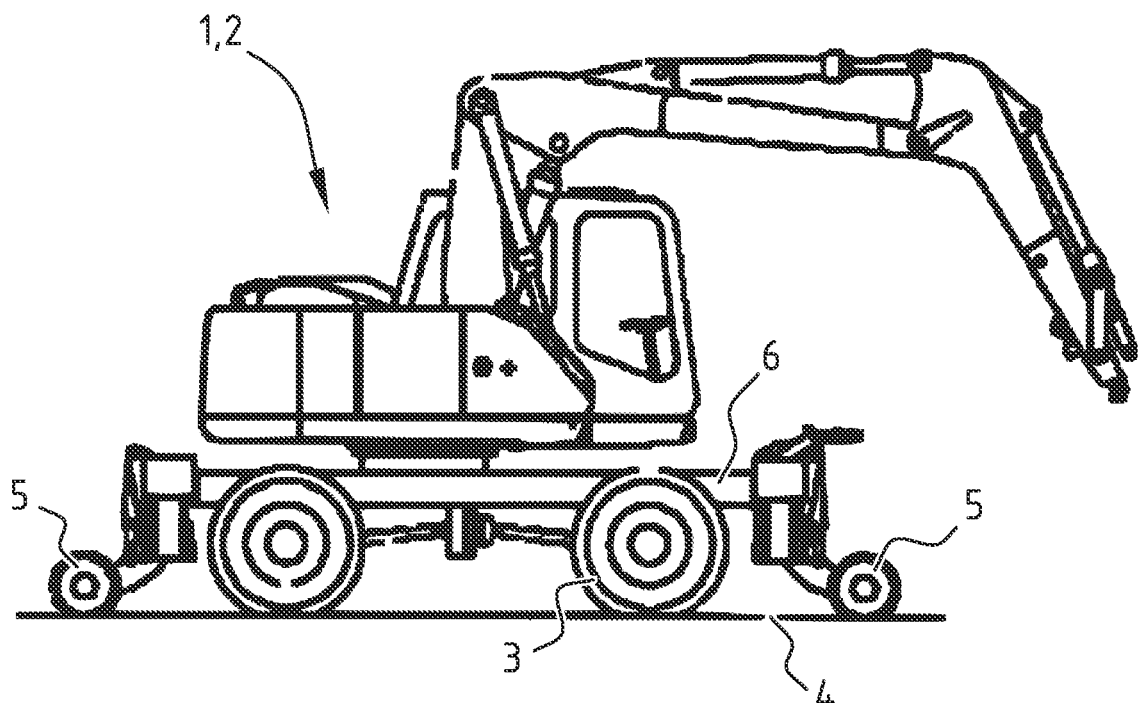
FIG. 1 is a side view of a rail vehicle in a low-rider configuration.

The vehicle 1 shown in FIG. 1 is a rail vehicle which is embodied as an excavator 2 that has a so-called low-rider configuration. In some rail standards, such a low-rider configuration is also referred to as a "9C configuration". In a low-rider configuration, the vehicle 1 is normally driven by the road wheels 3 that are in contact with the rail track 4.

Figure 11:
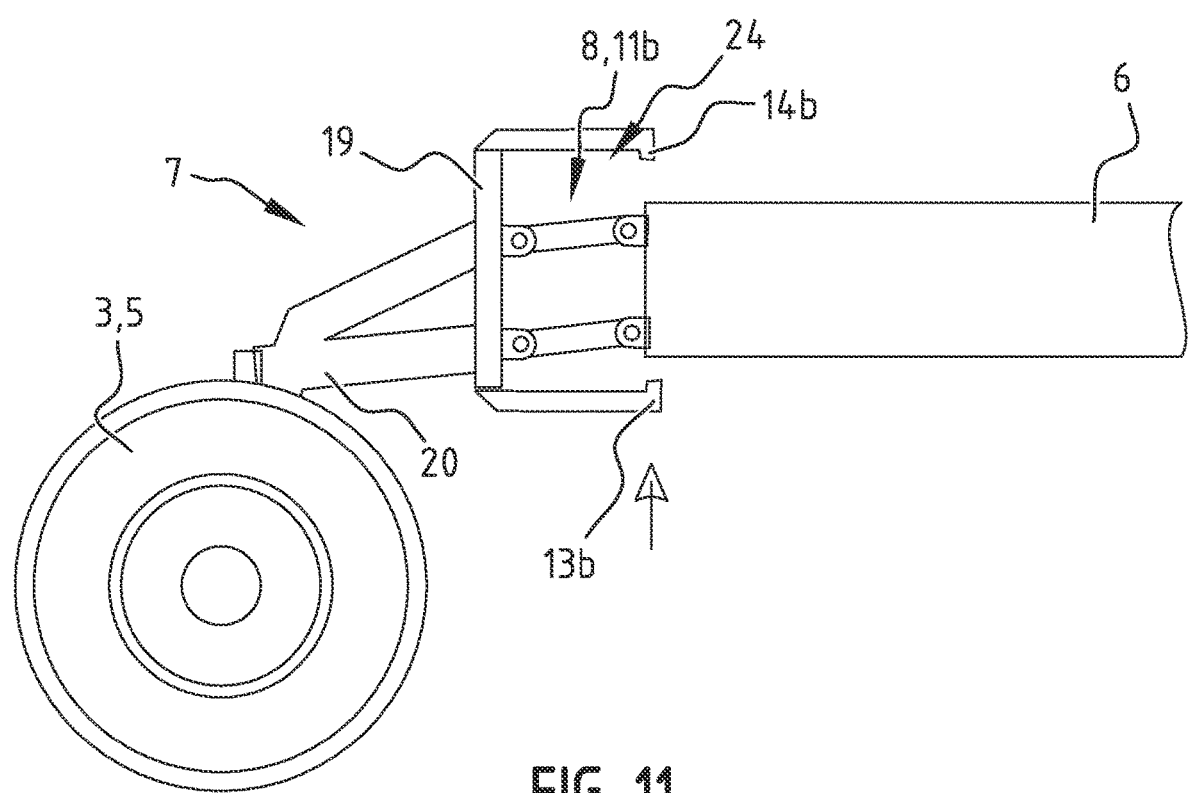
FIG. 11 is a schematic view of a terrain or road vehicle according to the invention.

As explained above, a hybrid rail vehicle in a low-rider configuration is especially susceptible for derailment caused by an obstacle 10 adjacent the rail track. Moreover, an excavator 2 is susceptible to derailment when heavy loads are lifted adjacent the rail track. The skilled person will however understand that a stabilizer 24 of the invention is not limited to rail vehicles alone, but may also be applied to terrain or road vehicles, an example of which is shown in FIG. 11.

Figure 2:
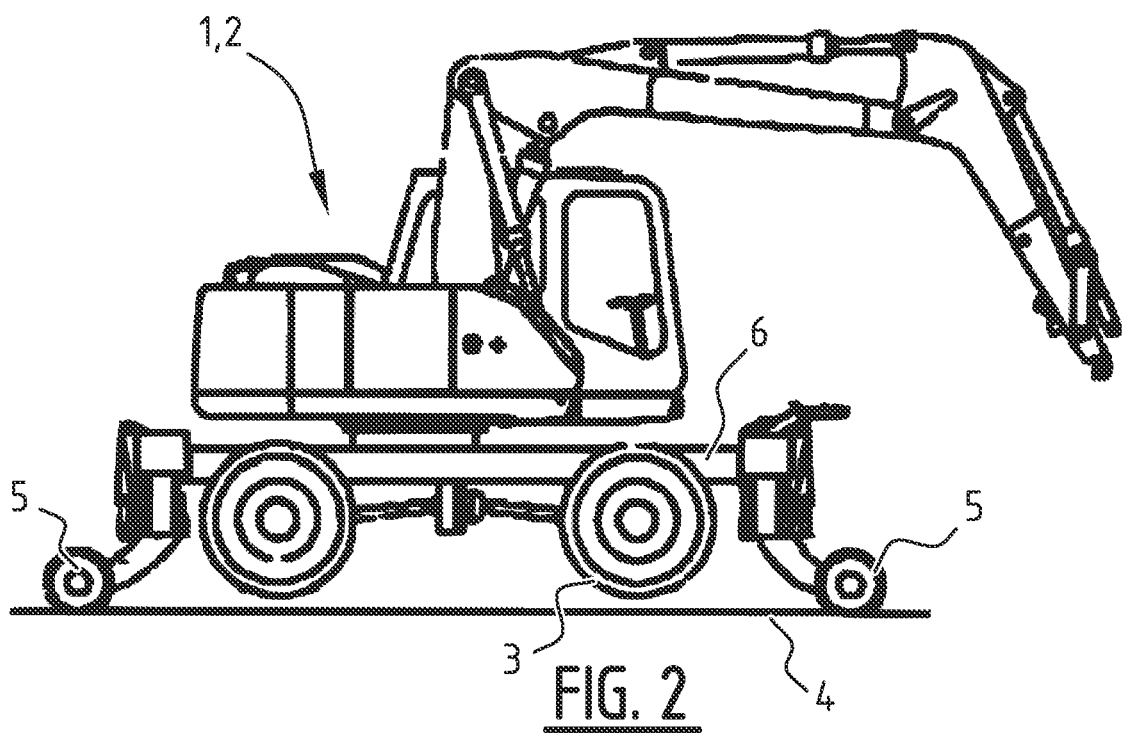
FIG. 2 is a side view of a rail vehicle in a high-rider configuration.

The vehicle 1 shown in FIG. 2 is a rail vehicle which is embodied as an excavator 2 that has a so-called high-rider configuration. In some rail standards, such a high-rider configuration is also referred to as a "9A configuration". In a high-rider configuration, the road wheels 3 (or caterpillars) are lifted relative to the rail track 4 such that there is a vertical offset between the road wheels 3 and the rail track 4. Consequently, the vehicle 1 is now driven via the track bounded wheels 5, hereafter also referred to as track wheels 5, because they may be temporarily disengaged from the rail track 4, e.g. when said excavator 2 is driving on its road wheels 3 away from the rail track 4. Normally, the track wheels 5 have a dedicated drive, but alternatively they may be arranged in contact with the road wheels 3 that drive said track wheels 5 via friction. As an alternative to road wheels 3, the vehicle 1 may have (not shown) tracks.

Figure 3A:
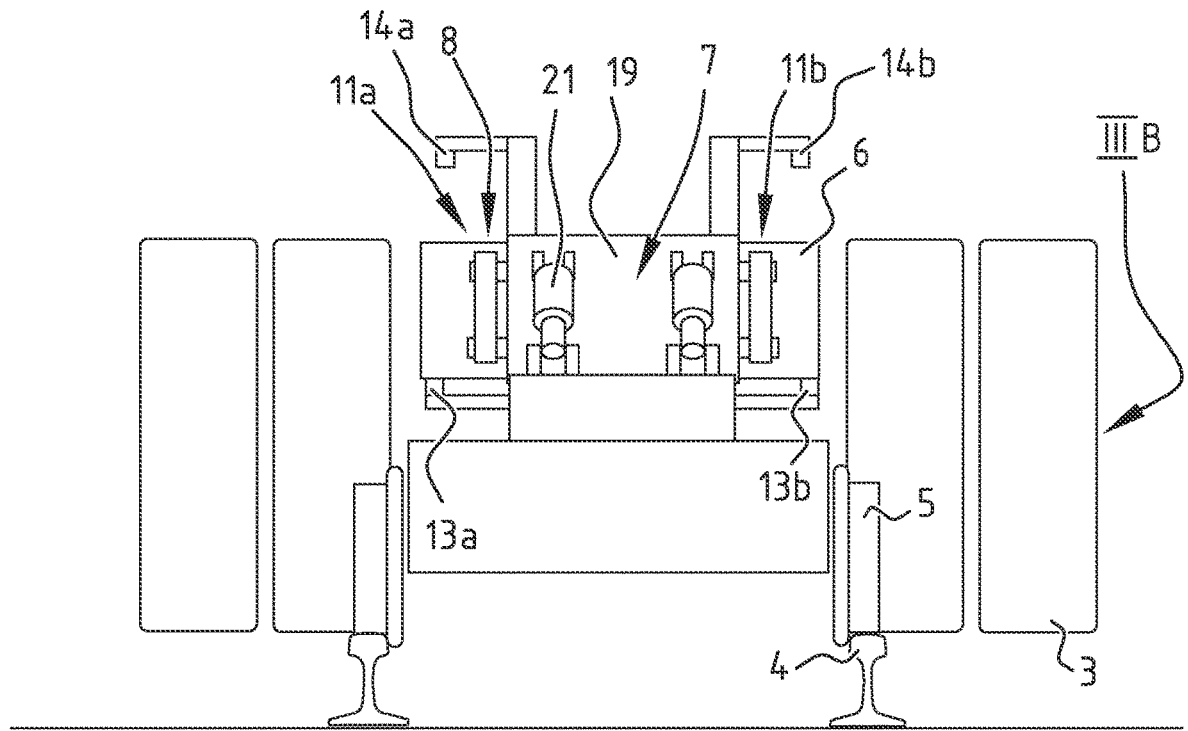
FIG. 3A is a schematic frontal view of the rail vehicle in the low-rider configuration of FIG. 1 in a normal use situation.
Figure 3B:
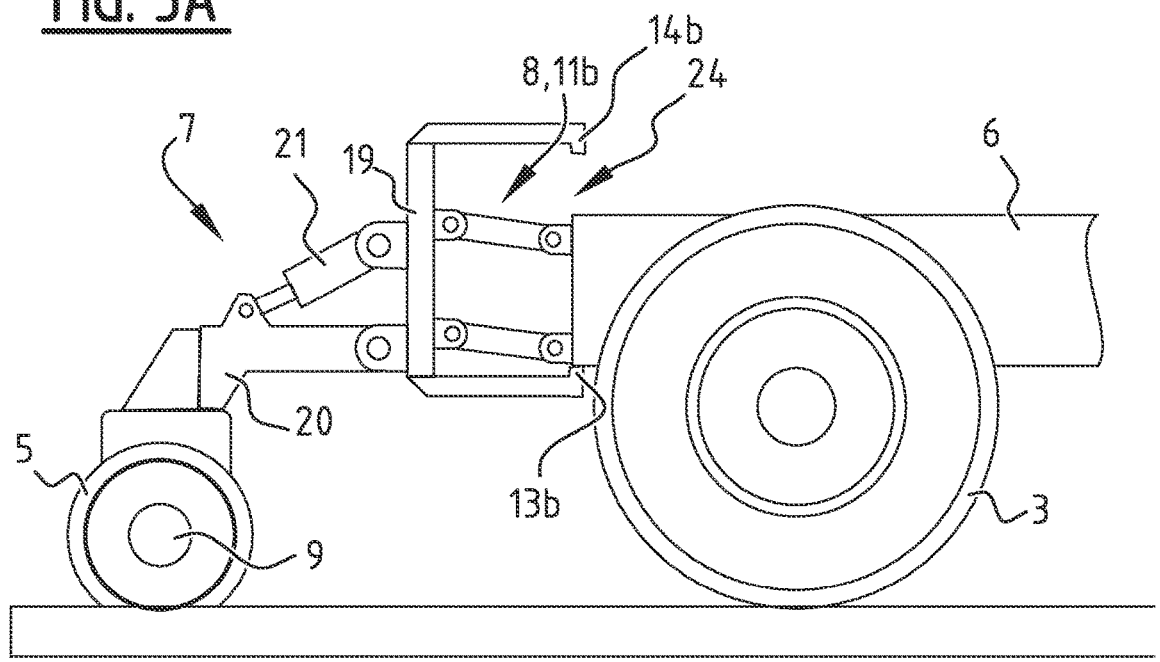
FIG. 3B is a schematic side view of the rail vehicle of FIG. 3A.

FIGS. 3A and 3B show the vehicle 1 in the low-rider configuration of FIG. 1 in a normal use situation, wherein the road wheels 3 are in contact with the rail tracks 4 and capable of driving the vehicle 1. The vehicle 1 comprises a chassis 6, a support frame 7 supporting at least one shaft 9 and a set of wheels 5. In case of a rail vehicle, the set of wheels 5 is a set of track (bounded) wheels. A suspension 8 is arranged between the chassis 6 and the support frame 7. Said suspension 8 is configured to allow a free vertical displacement of one of the support frame 7 and the chassis 6 relative to the other. This free vertical displacement is over a restricted range.

The suspension 8 effectively prevents that a movement of the chassis 6 is directly transferred to a movement of the support frame 7. Thus, when the chassis 6 moves, the support frame 7 may still continue to support the at least one shaft 9 in an orientation wherein the track wheels 5 are and remain in a secure contact with the respective rail track 4. The weight of the support frame 7 supporting the at least one shaft 9 and the set of track wheels 5 contributes to the force pressing the track wheels 5 on the rail track 4.

Figure 4A:
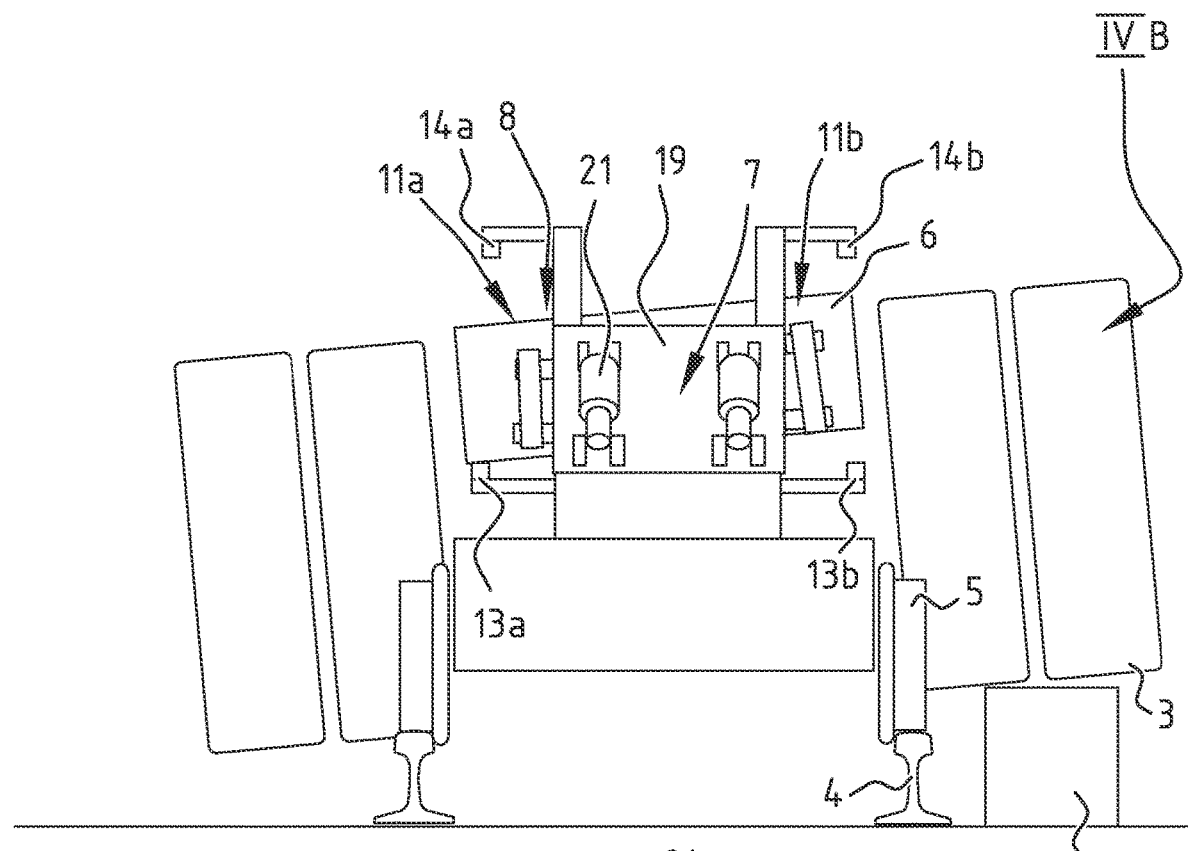
FIG. 4A is a schematic frontal view of the rail vehicle in the low-rider configuration of FIG. 1 lifted by an obstacle.
Figure 4B:
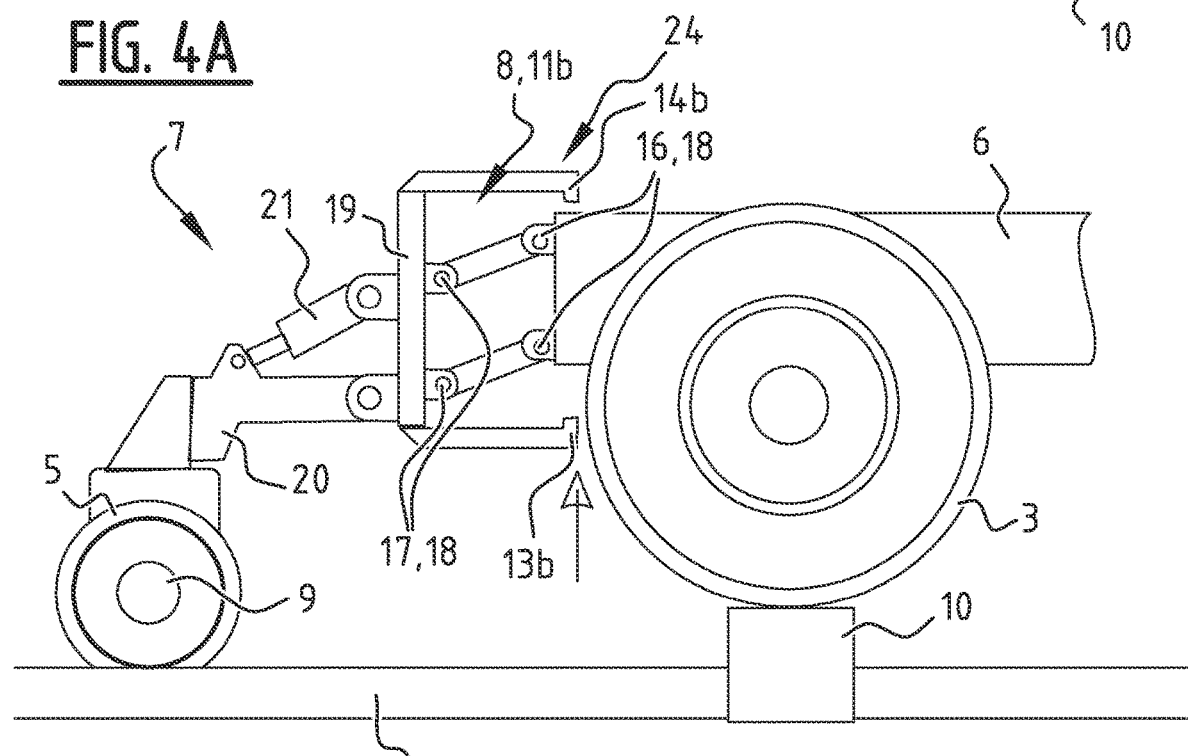
FIG. 4B is a schematic side view of the rail vehicle of FIG. 4A.

A movement of chassis 6 of a hybrid rail vehicle 1 may be caused when the road wheels 3 come into contact with an obstacle 10 (FIGS. 4A, 4B). The road wheels 3 on one side of the chassis 6 are lifted by the obstacle 10, causing a tilting of the chassis 6. However, the track wheels 5 may remain on the respective rail tracks 4, as will be explained further below.

In the embodiment shown, the suspension 8 comprises a guide 11a and a further guide 11b. The guide 11a and the further guide 11b are arranged on opposite sides, and preferably symmetrically, relative to a longitudinal axis of said vehicle 1.

Figure 5A:
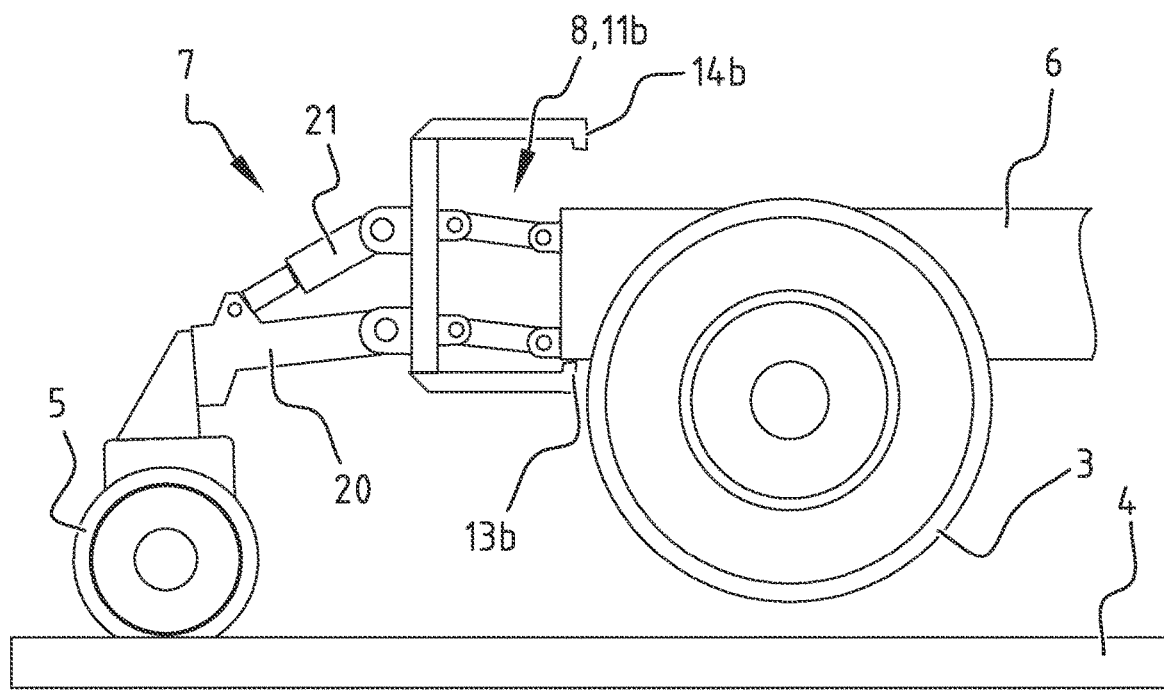
FIG. 5A is a schematic side view of the rail vehicle in the high-rider configuration of FIG. 2 in a normal use situation conform FIG. 3B.
Figure 5B:
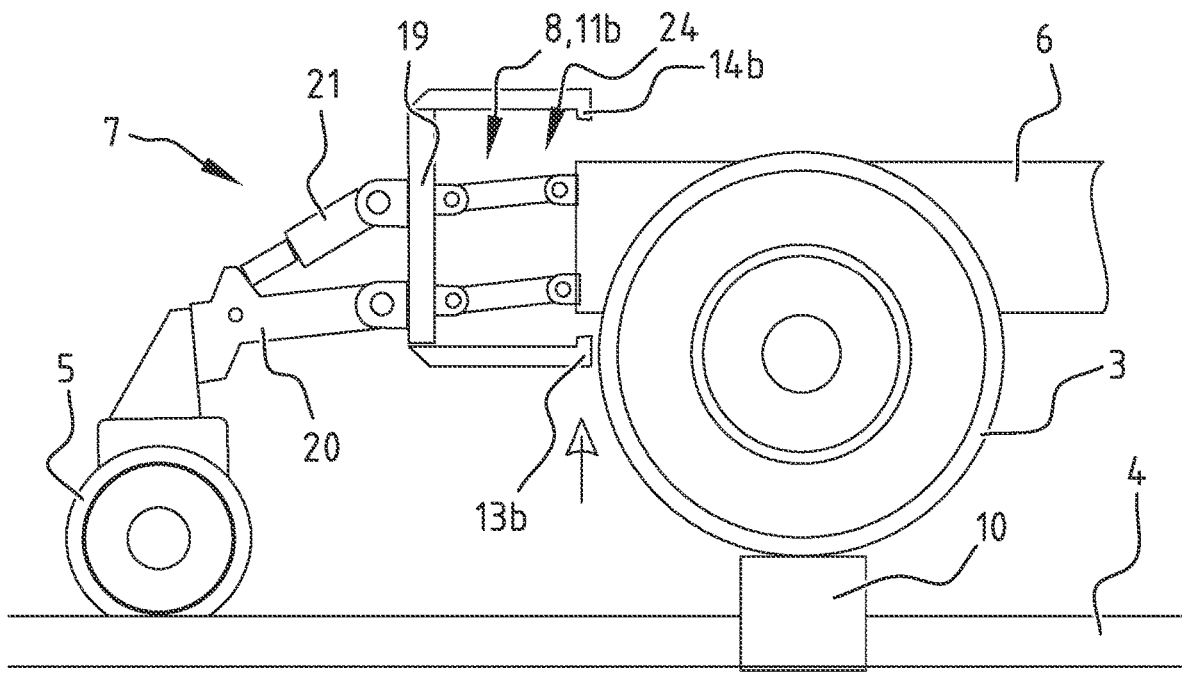
FIG. 5B is a schematic side view of the rail vehicle of FIG. 5A when lifted by an obstacle conform FIG. 4B.

The suspension 8 may comprise a lower stop 13a. 13b. For example, the guide 11a, and preferably also the further guide 11b, of the suspension 8 may comprise a lower stop 13a, 13b respectively. The lower stop 13a. 13b is configured to restrict a relative displacement between the support frame 7 and the chassis 6. In the normal use situation shown in FIGS. 3A, 3B and 5A, the chassis 6 is supported by the lower stops 13a, 13b. However, when a tilting of the chassis 6 occurs as shown in FIGS. 4A, 4B and 5B, the chassis 6 is lifted on one side. As can be best seen in FIG. 4A, the chassis 6 is lifted from the lower stop 13b on the side of the obstacle 10. The lower stop 13a on the opposite side will then act as a pivot point around which the chassis 6 pivots.

Figure 6A:
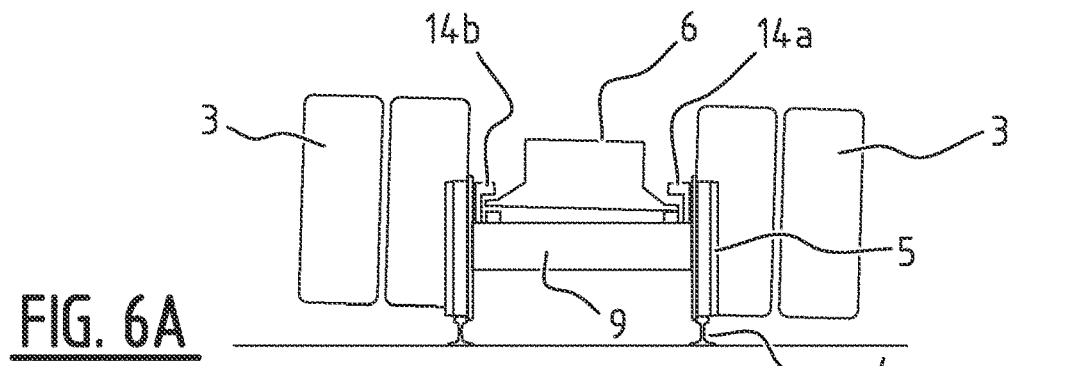
FIG. 6A is a rear view of a rail vehicle according to the invention.
Figure 6B:
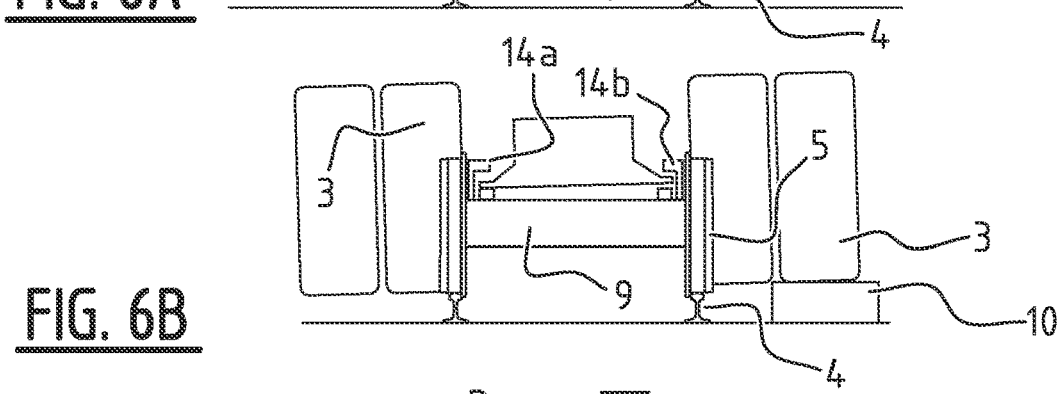
FIG. 6B is a frontal view of the rail vehicle of FIG. 6A.
Figure 6C:
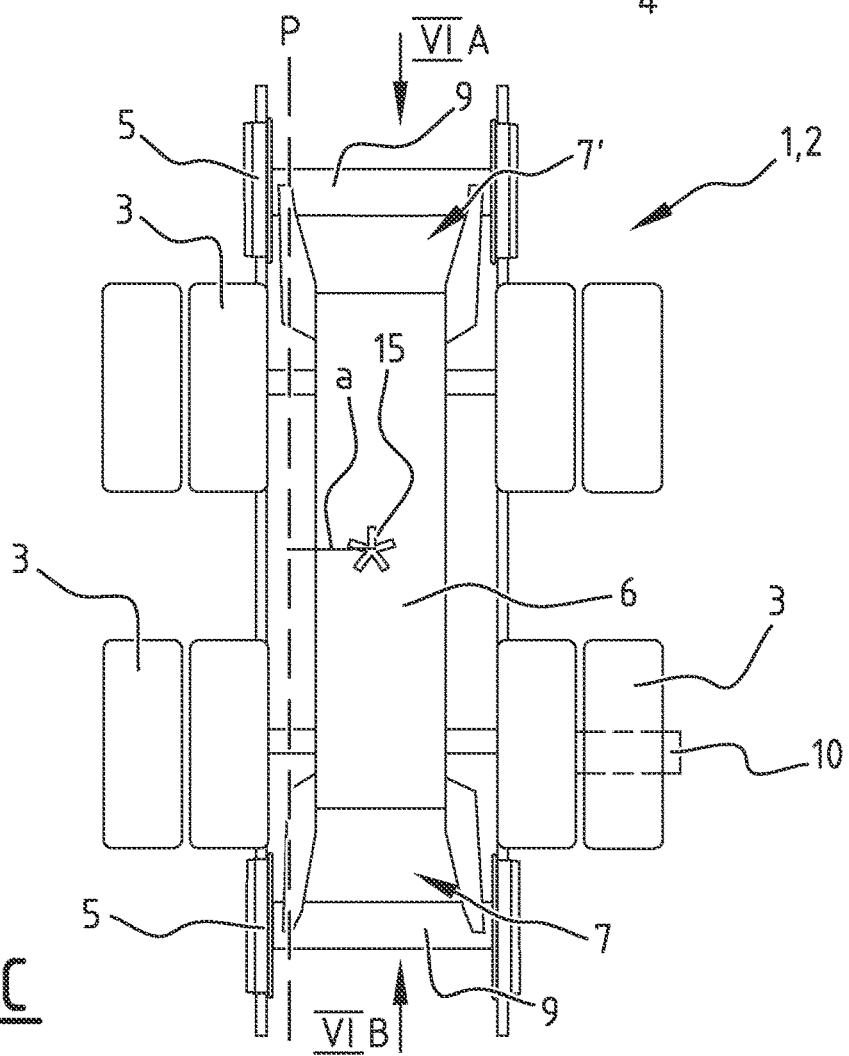
FIG. 6C is a top view of the rail vehicle of FIG. 6A.

The top view of FIG. 6C shows how two such pivot points 13a may define a pivot axis P. Although FIGS. 6A-6C show a situation wherein the chassis 6 is lifted due to an upward force being caused by one of the road wheels 3 engaging an obstacle 10, the exact same situation may occur if the vehicle 1 is an excavator lifting a heavy load on the opposite side as where the obstacle 10 is shown. For example, when an excavator 2 lifts a heavy load, the chassis 6 will try to tilt towards the side where the load is lifted. In the top view of FIG. 6C, the load would be lifted on the left side of the vehicle 1. This pivot axis P is relatively far away from the center of gravity 15 of the vehicle 1, thereby contributing to the stability of the vehicle 1.

FIG. 6A shows a rear view of the vehicle 1 of FIG. 6A, and FIG. 6B shows a frontal view of the vehicle 1 of FIG. 6C. The front road wheel 3 shown on the right side in FIG. 6C is lifted by obstacle 10, and due to the rigidity of chassis 6, also the rear road wheel is lifted. This can be seen in FIG. 6A, which is a view from the rear as indicated with arrow VI A in FIG. 6C, and thus FIG. 6A is a mirrored view of FIG. 6B.

The suspension 8 may comprise an upper stop 14a, 14b. For example, the guide 11a, and preferably also the further guide 11b, of the suspension 8 preferably further comprise an upper stop 14a, 14b respectively. The upper stop 14a, 14b is configured to restrict a relative displacement between the support frame 7 and the chassis 6. The upper stop 14a, 14b on the one hand allows the support frame 7 to be lifted relative to the chassis 6, and thereby provide enough space to drive the vehicle 1 on a (not shown) ramp, e.g. a ramp of a trailer for transport of the said vehicle 1. The upper stop 14a, 14b on the other hand, and even more importantly, counteracts further tilting of said chassis 6 in two ways. Firstly, the upper stop 14a, 14b being engaged will only allow the chassis 6 to tilt even further if it would also tilt the stabilizer 24 along, meaning that the weight counteracting this tilting movement is significantly increased. Secondly, the pivot around which the tilting occurs is no longer defined by the lower stop 14a, 14b. Instead, the pivot is now displaced outward and downward to the contact point of the wheels 3, 5 on the ground. The combination of the additional weight counteracting the tilting movement of the vehicle 1 and the pivot point being displaced outward and downward provides a relatively large safety margin, and the driver is already notified of entering this safety margin by the chassis 6 being stopped tilting by the upper stop 141, 14b. In this way, a very stable and safe vehicle 1 is obtained.

In the preferred embodiment shown in the Figures, the at least one of the guide 11a, and preferably also the further guide 11b, comprise a parallelogram construction. Using a parallelogram construction, it is possible to provide a guide that is substantially free of play, contrary to e.g. an alternative using a slotted recess. Consequently, a parallelogram construction provides a system with less wear than a slotted recess. Moreover, any shocks during acceleration and deceleration and reduced to a minimum if play is absent.

In order to allow tilting of the chassis 6 relative to the support frame 7 as shown in FIG. 4A, it is advantageous if at least one of a connection 16 between the suspension 8 and the chassis 6 and a connection 17 between the suspension 8 and the support frame 7 comprises a radial joint bearing 18. Preferably, all said connection 17, 18 comprise a radial joint bearing 18, resulting in a total of eight radial joint bearings 18 for the combination of guide 11a and further guide 11b.

The support frame 7 comprises a base 19 that is attached to the suspension 8 and a wheel support 20 that is moveably. i.e. pivotably in the shown embodiment, or alternatively slidingly, attached to the base 19 and that is configured to support the at least one shaft 9 and the set of track wheels 5. The support frame 7 may further comprise an actuator 21 that is configured to set a relative orientation between the base 19 and the wheel support 20. The actuator 21 may comprise a hydraulic cylinder.

As mentioned already above, when the chassis 6 moves, the support frame 7 may continue to support the at least one shaft 9 in an orientation wherein the track wheels 5 are in a secure contact with the respective rail track 4. The weight that contributes to the force pressing the track wheels 5 on the rail track 4 is the combined weight of the support frame 7 and the at least one shaft 9 and the set of track wheels 5. Additionally, a partial weight of the vehicle may also be transferred via the chassis 6 to the track wheels 5 as long as at least one lower stop 13a, 13b is supporting said chassis 6. The weight of the support frame 7 is the combined weight of the base 19, the wheel support 20 and the actuator 21. By suspending the support frame 7 relative to the chassis 6, it is guaranteed that a relatively high total weight rests on the track wheels 5, even if the chassis 6 itself would be lifted off of a lower stop 13a, 13b. Moreover, this relatively high total weight resting on the track wheels 5 is mainly obtained by components that are required anyway. Thus, the positioning of the suspension 8 allows the track wheels 5 to benefit from the weight of already existing components, such as the actuator 21, while the additional support frame 7 adds extra weight. In this way, compared to a conventional vehicle, the load that is guaranteed to rest on the track wheels 5 is significantly increased, whereas a total weight of the vehicle 1 is only increased by a limited amount.

Preferably, the vehicle 1 comprises a further support frame 7' and associated suspension, wherein said further support frame 7' is, relative to the support frame 7, arranged on an opposite side of the chassis 6. Thus, the support frame 7 is arranged on a first side of the chassis 6, and the vehicle 1 comprises a further support frame 7' comprising a set of wheels 5 that is arranged on a second side of the chassis opposite the first side. Such an embodiment is shown in FIGS. 6A-C.

In the embodiment of FIG. 6, the at least one shaft 9 is a shaft 9 having two track wheels 5 arranged on opposite ends thereof. However, in an alternative embodiment shown in FIG. 7, the track wheels 5 may each comprise a dedicated shaft 9, that may be a drive shaft of a dedicated drive 22. If a drive 22 is arranged in the support frame 7, this further increases the mass of the support frame 7 and thus contributes to the force pressing the track wheels 5 onto the rail tracks 4. Moreover, it allows a rail vehicle 1 to be used in a high-rider configuration, possibly in addition to the option to use said same rail vehicle 1 also in a low-rider configuration.

Figure 7:
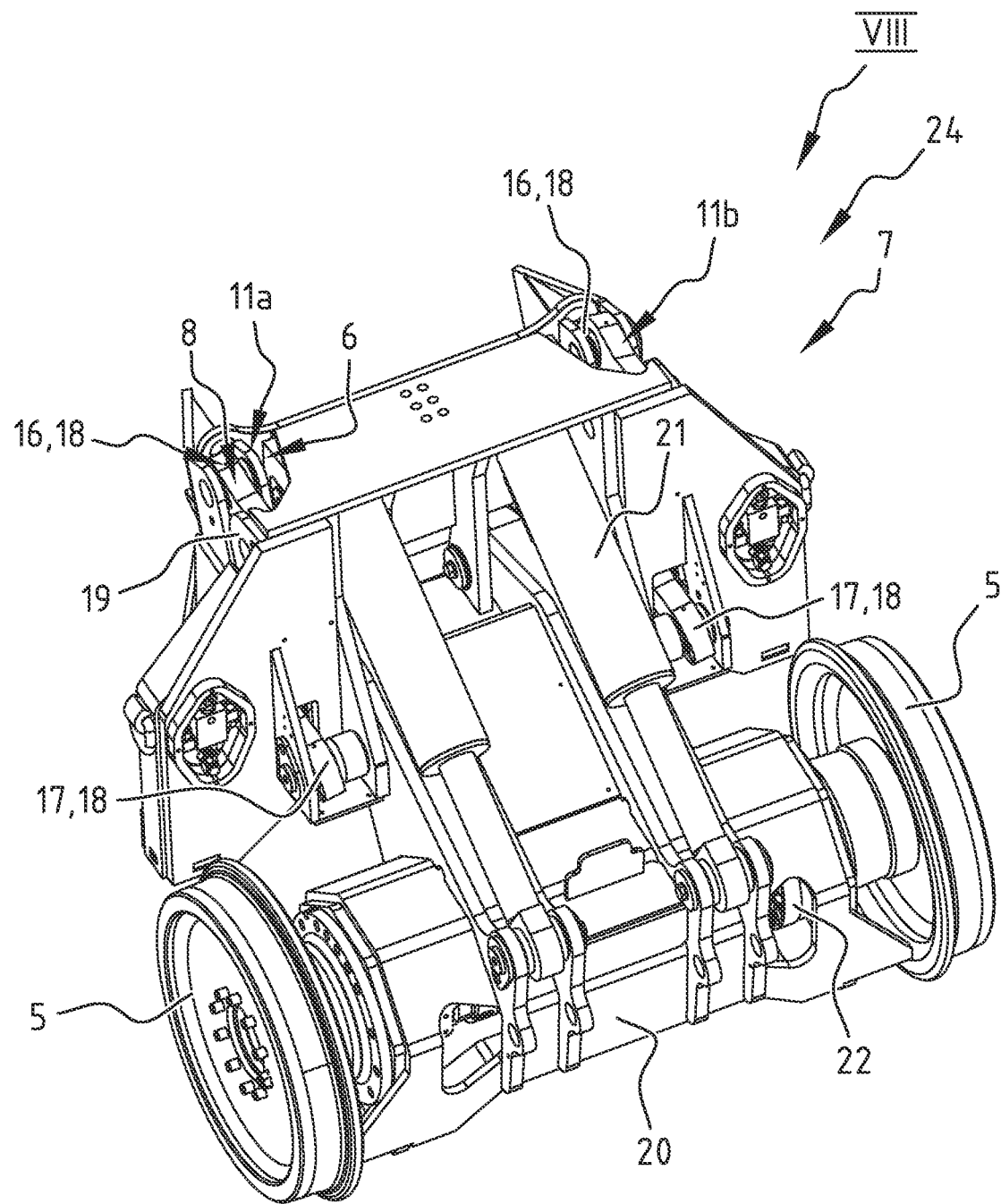
FIGS. 7 and 8 are perspective views of a support frame and suspension of a rail vehicle according to the invention.
Figure 8:
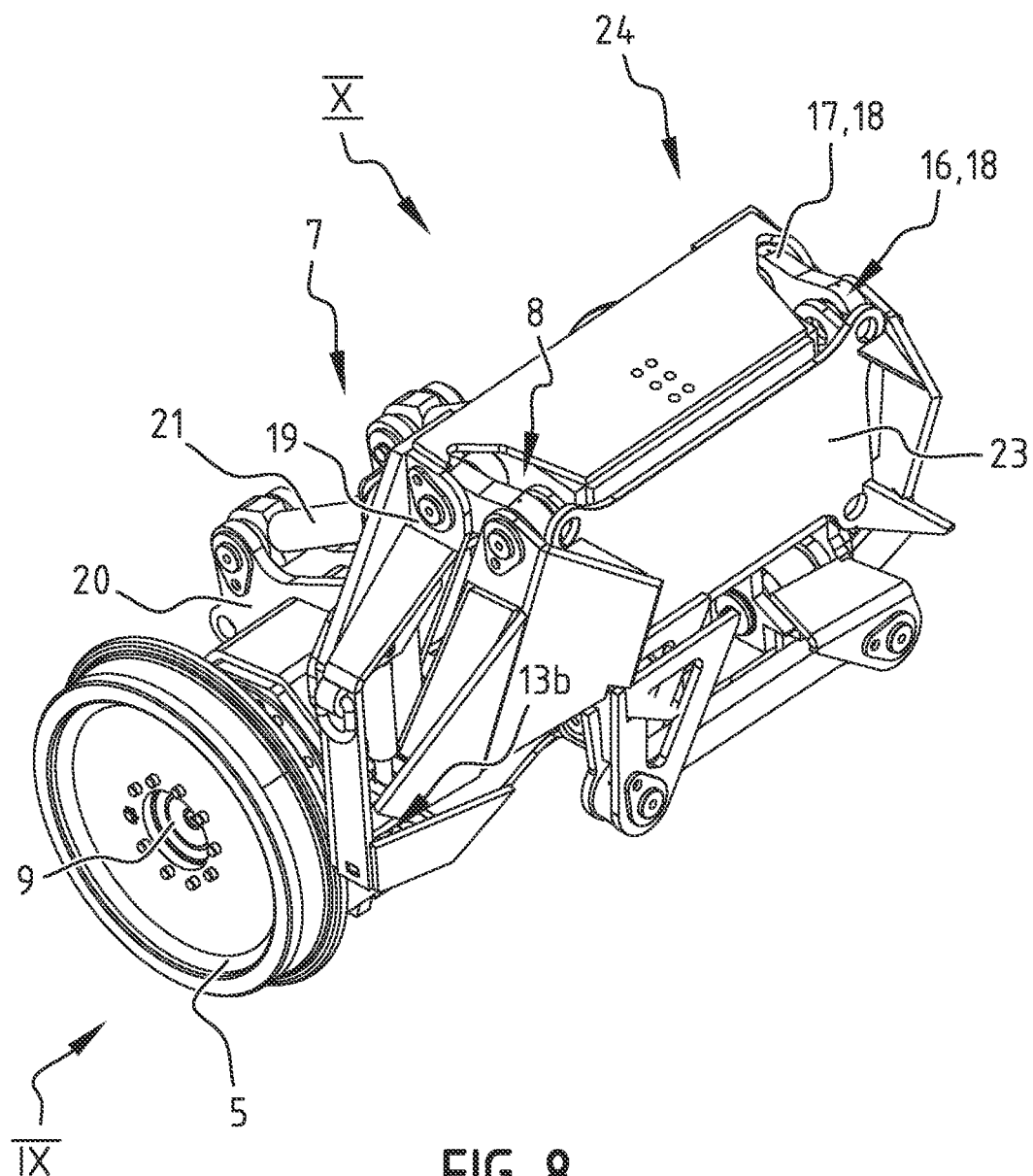
Figure 9:
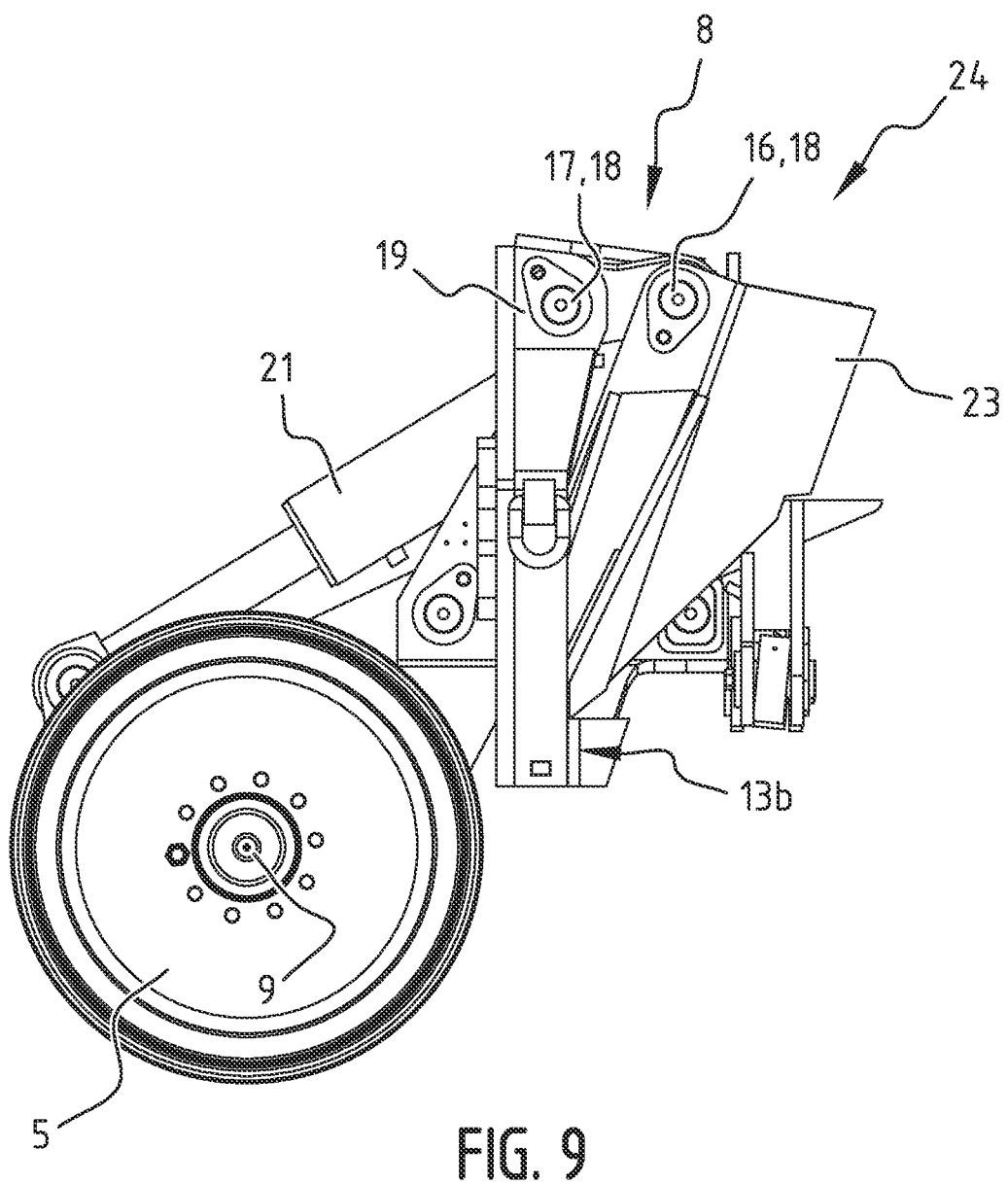
FIG. 9 is a side view of FIG. 8.
Figure 10:
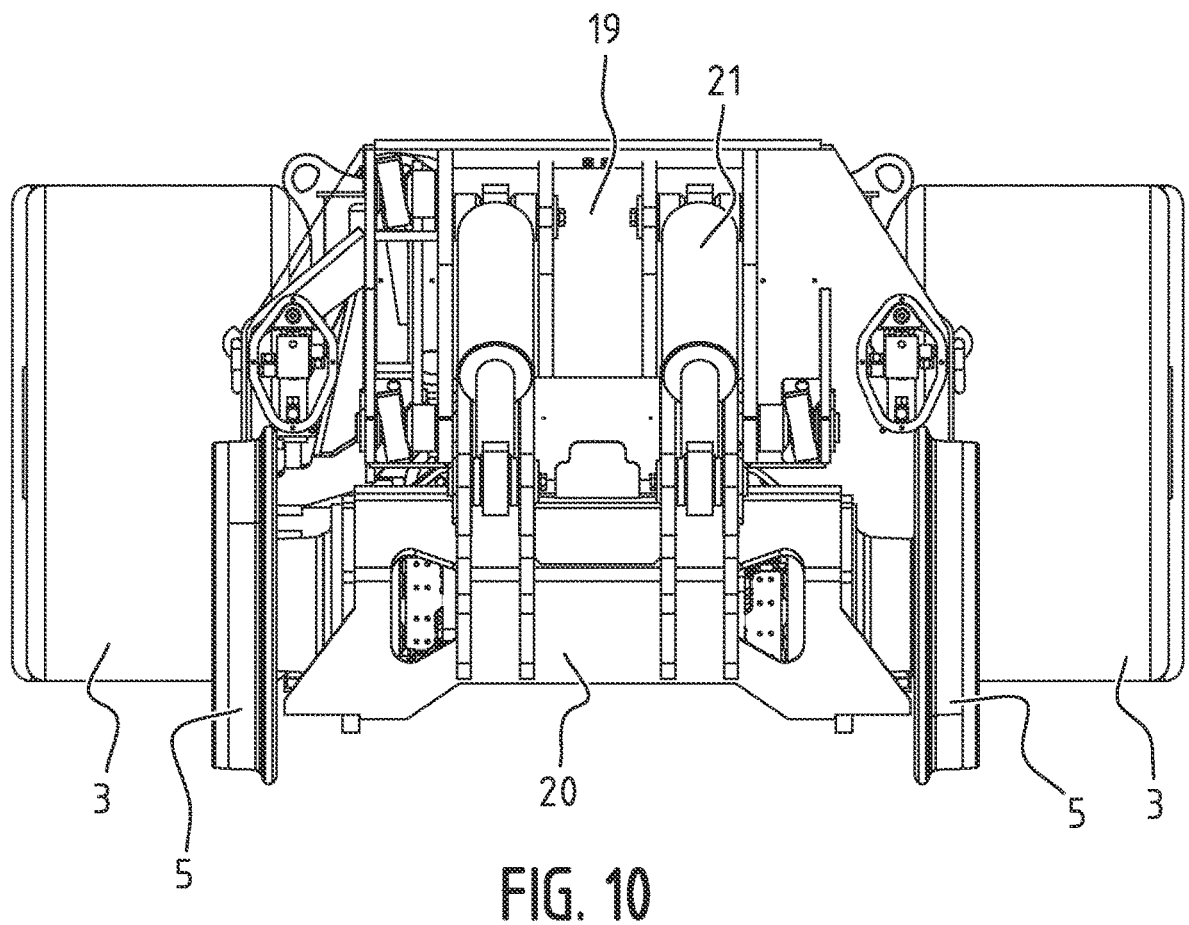
FIG. 10 is a front view of FIG. 7 when connected to a chassis.

FIGS. 7-9 show different views of a practical embodiment of the rail support frame 7 having the base 19 and the suspension 8. A connector 23 that is configured to be connected to the chassis 6 is also shown. In FIG. 10, connector 23 is attached to the chassis 6 having the road wheels 3.

FIG. 11 shows vehicle 1 that is a terrain or road vehicle 1. Again, the stabilizer 24 comprises a support frame 7 and a suspension 8. The stabilizer 24 allows the support frame and the chassis to move relative to each other. Thus, when the chassis tilts for some reason, e.g. due to a terrain or road vehicle 1 driving on a sloping terrain or when an excavator lifts a load on a side thereof, the chassis 6 may move relative to the support frame 7. The support frame 7 supports the at least one shaft and a set of wheels 5, which in case of a terrain or road vehicle comprises road wheels. The support frame 7, that supports the at least one shaft and a set of wheels 5, thereby allows the set of wheels 5 to remain unaffected by the tilt of the chassis 6. Moreover, not only does stabilizer 24 with its suspension 8 allow the wheels 5 to remain on the ground, the weight of the stabilizer 24 also contributes to the force at which the wheels 5 are pushed on the ground. The stabilizer 24 thus functions two-fold: on the one hand if provides sufficient free vertical displacement, while on the other hand it increases the load on the wheels 5. Although the vehicle shown in FIG. 11 comprises a support frame 7 that is fixed to the base 19, said vehicle may also comprise a support frame 7 as shown in FIGS. 3B, 4B and 5B, wherein the wheel support 20 is pivotably arranged relative to the base 9, and comprises a (not shown) actuator 21 that may set an orientation of the wheel support 20 relative to the base 19.

Figure 12A:
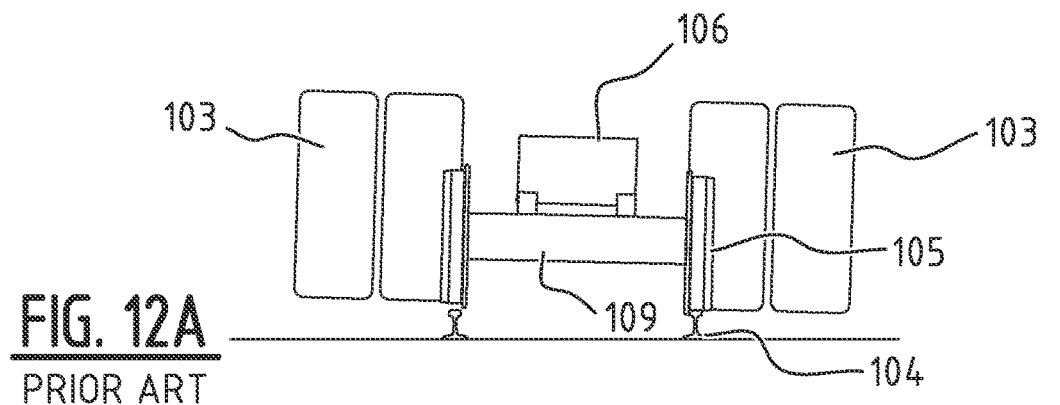
FIG. 12A is a rear view of a rail vehicle according to the prior art.
Figure 12B:
FIG. 12B is a frontal view of the prior art rail vehicle of FIG. 12A.
Figure 12C:
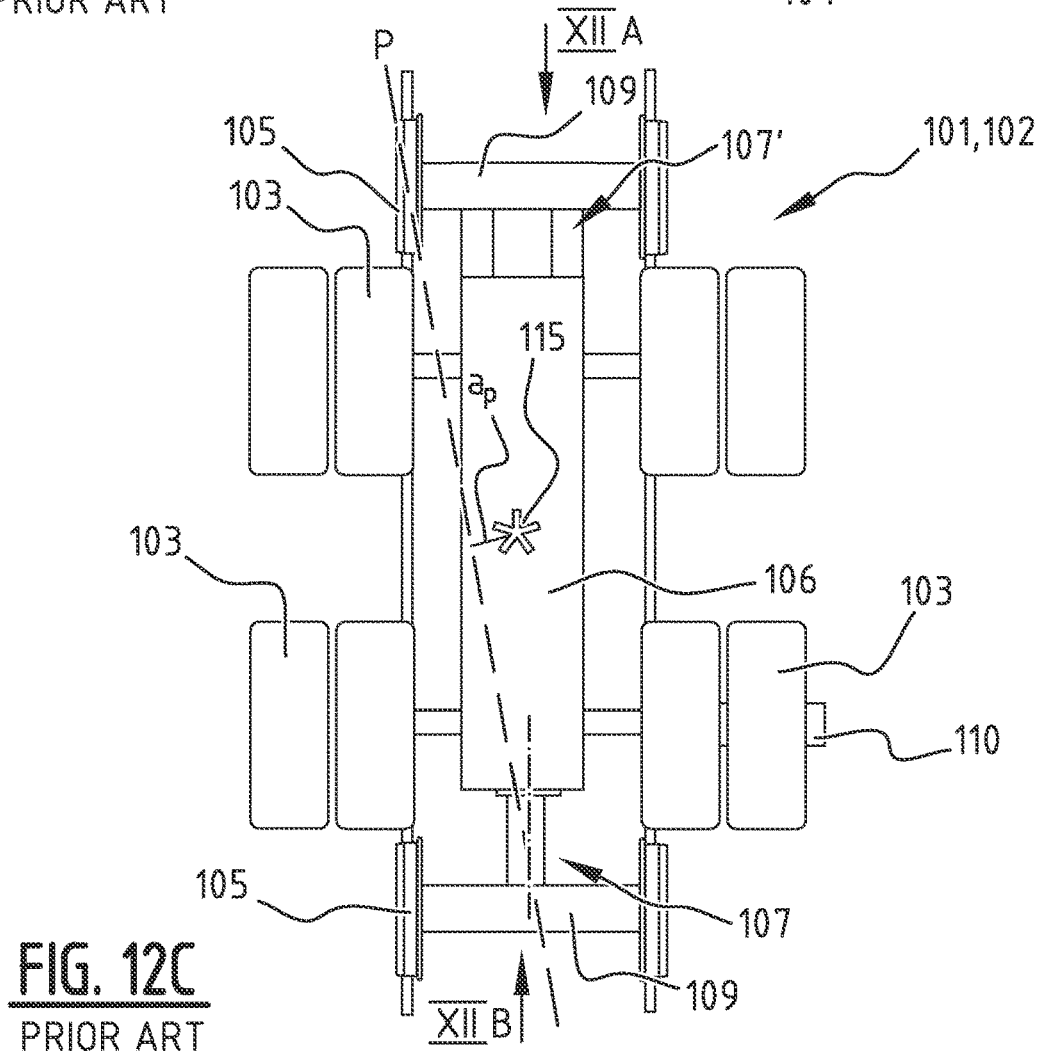
FIG. 12C is a top view of the prior art rail vehicle of FIG. 12A.

FIGS. 12A-12C show a prior art configuration having a pendulum suspension, such as e.g. disclosed in EP 3 225 496 A1. The load in FIGS. 12A-12C is, similar to FIGS. 6A-6C, elucidated using an obstacle 110 that lifts one of the wheels of the vehicle 101. Because the chassis 106 is rigid, the road wheels 103 on the side of the obstacle 110 are both lifted, causing the chassis 106 to tilt around the pivot axis P defined by one of the track wheels 105 and the pivot point 125 of the pendulum suspension. In practice, the pendulum suspension may be temporarily fixed, resulting in a rigid vehicle that easily derails if the track is uneven.

FIGS. 12A-12C may be easily compared with FIGS. 6A-6C, which show similar views for the present invention. It is easily recognizable how the imaginary pivot axis P for a pendulum configuration according to the prior art closely passes the center of gravity (COG) 115 at an arm of momentum $a_p$. The arm of momentum "a" according to the invention (shown in FIG. 6C) is significantly larger than the arm of momentum of the prior art pendulum configuration "$a_p$" (shown in FIG. 12C), thus "$a>a_p$", resulting in an improved stability of the vehicle.

The above described embodiment is intended only to illustrate the invention and not to limit in any way the scope of the invention. As hybrid rail vehicles comprising road wheels or caterpillars are more susceptible for derailment than fully track bounded vehicles such as trains. This is caused by the road wheels or caterpillars that may be lifted by an obstacle that is arranged adjacent the rail track that guides the rail vehicle. For this reason, the shown embodiment in FIGS. 1-10 describe an example of a hybrid rail vehicle, which may be an excavator conform FIGS. 1 and 2. The skilled person will however understand that the principle according to the invention may also be used to minimize the risk of other types of rail/road vehicles, a fully track bounded vehicle such as a train, tram or subway experiencing derailment due to uneven rail tracks, or to stabilize a terrain or road vehicle as schematically shown in FIG. 11.

It should be understood that where features mentioned in the appended claims are followed by reference signs, such signs are included solely for the purpose of enhancing the intelligibility of the claims and are in no way limiting on the scope of the claims. The scope of the invention is defined solely by the following claims.

The invention claimed is:

1. A vehicle, configured to drive on rails, terrain or road, comprising:
 a chassis; and
 a stabilizer, comprising:
  a support frame that comprises a wheel support that is configured to support at least one shaft and two wheels arranged on opposite sides relative to a longitudinal axis of said vehicle and defining a track width between said two wheels; and
  a base supporting said support frame, wherein the chassis is connected to at least one further set of wheels, and wherein the stabilizer further comprises a suspension connecting said base relative to said chassis, wherein one end of the suspension is connected to the base with a first hinged connection and another opposite end of the suspension is connected to the chassis with a second hinged connection, whereby the suspension is configured to allow a free vertical displacement of one of the base and the chassis relative to the other over a restricted range to thereby prevent that a movement of the chassis is directly transferred to a movement of the support frame and allow a weight of the support frame supporting the at least one shaft and the two wheels to contribute to a force pressing said two wheels downward,
 wherein the suspension comprises a guide that comprises a parallelogram construction or a slotted recess, and wherein the suspension comprises an upper stop and a lower stop.

2. The vehicle according to claim 1, wherein the suspension comprises two lower stops arranged under the chassis on opposite sides relative to the longitudinal axis of said vehicle.

3. The vehicle according to claim 2, wherein each one of the two lower stops is arranged in between the two wheels.

4. The vehicle according to claim 2, wherein each one of the two lower stops is arranged in an outer half of the distance between the longitudinal axis of said vehicle and the wheel on that respective side.

5. The vehicle according to claim 1, wherein the suspension comprises two upper stops arranged above the chassis on opposite sides relative to the longitudinal axis of said vehicle.

6. The vehicle according to claim 5, wherein each one of the upper stops is arranged in between the two wheels.

7. The vehicle according to claim 5, wherein each one of the upper stops is arranged in an outer half of the distance between the longitudinal axis of said vehicle and the wheel on that respective side.

8. The vehicle according to claim 1, wherein the suspension comprises a further guide, wherein at least one of:
  the guide and the further guide are arranged on opposite sides relative to the longitudinal axis of said vehicle; and
  the further guide comprises a parallelogram construction.

9. The vehicle according to claim 1, wherein at least one of a connection between the suspension and the chassis and a connection between the suspension and the support frame comprises a radial joint bearing.

10. The vehicle according to claim 9, wherein the wheel support is movably attached to the base and wherein the support frame further comprises an actuator that is configured to set a relative orientation between the wheel support and the base; and
  wherein the actuator comprises a hydraulic cylinder.

11. The vehicle according to claim 1, wherein the at least one shaft is a shaft having the two wheels arranged on opposite ends thereof.

12. The vehicle according to claim 1, comprising a further support frame and associated suspension, wherein said further support frame is, relative to the support frame, arranged on an opposite side of the chassis.

13. The vehicle according to claim 1, wherein:
  the vehicle is a rail vehicle; and
  the set of wheels comprises track wheels.

14. The vehicle according to claim 1, wherein the chassis comprises road wheels or caterpillars.

* * * * *